(12) United States Patent
Wohlrab

(10) Patent No.: US 6,877,977 B2
(45) Date of Patent: Apr. 12, 2005

(54) TWO-PLATEN CLOSING SYSTEM FOR AN INJECTION MOLDING MACHINE

(75) Inventor: Walter Wohlrab, Weissenburg (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 210 days.

(21) Appl. No.: 10/349,327

(22) Filed: Jan. 22, 2003

(65) Prior Publication Data

US 2003/0175381 A1 Sep. 18, 2003

(30) Foreign Application Priority Data

Jan. 23, 2002 (DE) .......................... 102 02 374

(51) Int. Cl.[7] .............................................. B29C 45/68
(52) U.S. Cl. ....................... 425/589; 425/590; 425/595; 425/451.9
(58) Field of Search ................. 425/589, 590, 425/595, 450.1, 451.2, 451.7, 451.9

(56) References Cited

U.S. PATENT DOCUMENTS 5,261,810 A * 11/1993 Kamp et al. ............. 425/451.9
5,773,050 A * 6/1998 Wohlrab ................... 425/589

FOREIGN PATENT DOCUMENTS

| DE | 43 44 340 C2 | 6/1995 |
| JP | 2002200660 | 7/2002 |

* cited by examiner

Primary Examiner—James P. Mackey
(74) Attorney, Agent, or Firm—Henry M. Feiereisen; Ursula B. Day

(57) ABSTRACT

In a two plate closing unit of an injection molding machine the stationary and the movable mold mounting plates are connected by columns, wherein the columns that traverse the fixed mold mounting plate are fixedly connected to a clamping cylinder in which the columns configured at their ends as pressure plungers configured for generating a clamping pressure reciprocate, and while some of the clamping plungers are dual action plungers, the clamping plungers are coupled to a spindle drive and drive unit, such that the spindle drive is at the same time the control drive for a stepped plunger and the closing force and the closing and opening motion is realized by a single drive which operates the spindle and the plunger cylinder unit.

5 Claims, 1 Drawing Sheet

TWO-PLATEN CLOSING SYSTEM FOR AN INJECTION MOLDING MACHINE

CROSS-REFERENCES TO RELATED APPLICATIONS

This application claims the priority of German Patent Application, Serial No. DE 102 02 374.3 filed Jan. 23, 2002, pursuant to 35 U.S.C. 119(a)–(d), the disclosure of which is incorporated herein by reference.

BACKGROUND OF THE INVENTION

The present invention relates to a closing system and in particular a two-platen closing system for an injection molding machine.

Injection molding machines generally include at least two mold mounting plates, with one mold mounting plate fixedly anchored upon a machine bed and the other mold mounting-plate moveable relative thereto. The mold mounting plates carry respective half-molds. Opening and closing of the cavity involves a displacement of the moving mold mounting plate relative to the fixed mold mounting plate controlled by a mold closing unit.

From the prior art, for example from DE 43 44 340 C2, a two-platen closing system of an injection molding machine of the afore-described type is known, wherein in addition to the spindle drive for carrying out the opening and closing motion of the mold, a separate pressure source is required for generating pressure for closing the mold.

Such a system is not only more cumbersome to operate, but also has the additional drawback of requiring maintenance such as for example special lubrication of the spindle drive, in addition to a more complex maintenance of pressure fluid utilized.

It would therefore be desirable and advantageous to provide an improved two-platen closing system for a injection molding machine which obviates prior art shortcomings and which operates with only one drive, while requiring less maintenance and efficiently generating an opening/closing pressure.

SUMMARY OF THE INVENTION

According to one aspect of the present invention, a two-platen closing system for a injection molding machine is configured in such a way, that only one drive motor is needed for both the opening and the closing motion of the system.

According to another aspect of the present invention the two-platen closing unit for an injection molding machine includes a fixed mold mounting plate, a moving mold mounting plate, a plurality of columns received in the moving mold mounting plate and traversing the fixed mold mounting plate, each said column slidingly supported in the fixed mold mounting plate and having a clamping plunger received in a clamping cylinder, thereby defining a clamping pressure compartment, whereby the clamping pressure compartments in the clamping cylinders are in hydraulic communication with one another, wherein a first plurality of clamping plungers is configured as a dual-action plunger which divides the clamping cylinder into the clamping pressure compartment and an opening pressure compartment and includes a flow passage for connecting the clamping pressure compartment with the opening pressure compartment; a spindle drive coupled to a second plurality of clamping plungers and having spindles connected in driving relationship with a hydraulic piston and cylinder drive for feeding a hydraulic pressure medium into the clamping pressure compartments of the second plurality of clamping plungers, wherein the hydraulic piston and cylinder drive defines a pressure compartment; and a flow control valve disposed in the flow passage and including a stem-like valve body which closes the flow passage in a first operative position and clears the flow passage in a second operative position;

The present invention resolves prior art problems by utilizing only one drive for carrying out the control motions of opening and closing the mold and for generating the closing pressure and the two-platen closing unit can be operated more quietly and with less energy. Furthermore, the fluid of the hydraulic system can be maintained as a closed system by integrated filtering means thereby allowing a long service time of the pressure fluid, which in addition also obviates the need for special lubrication of the spindle drive.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
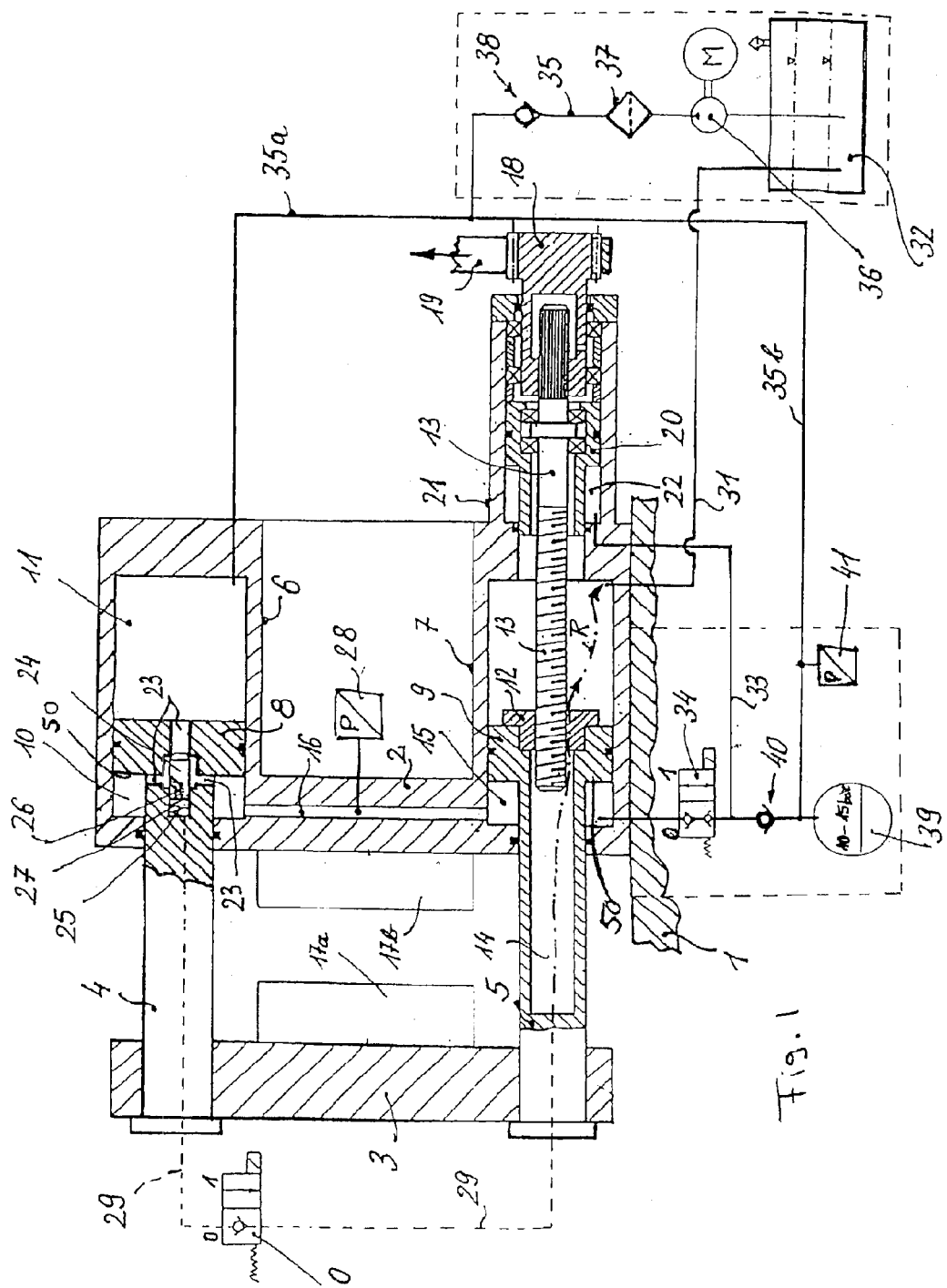
FIG. 1 is a side view of the two-platen closing unit of an injection molding machine according to the present invention, shown partially broken away to show detail.

The embodiment depicted here is to be understood as illustrative of the invention and not as limiting in any way.

Turning now to FIG. 1, there is shown a schematic side view of a two-platen closing unit according to the present invention including a fixed mold mounting plate 2 mounted on a machine bed 1, which is only partially shown here, and a movable mold mounting plate 3. The mold mounting plates 2 and 3 are connected to each other via four columns 4 and 5. The columns 4 and 5 traverse the fixed mold mounting plate 2 and at their ends the columns are provided with clamping plungers 8 and 9 that are movably guided within clamping cylinders 6 and 7. The clamping plungers 8 of each of columns 4 are dual action plungers, which divide each of the clamping cylinders 6 into a clamping pressure compartment 10 and an opening pressure compartment 11. The clamping plungers 9 of each of columns 5 are provided with a spindle nut 12 and a spindle 13 that traverses a hollow compartment 14 of column 5. The clamping pressure compartments 15, which are separated by the clamping plungers 9, are in fluid connection with clamping pressure compartment 10 via channels. In the upper portion of FIG. 1, a column 4 is shown with a dual action clamping plunger 8 and located behind column 4, is a column 5 (not shown here) disposed with a spindle drive that includes a spindle nut 12 and a spindle 13. The column 5 not shown here corresponds to the column 5 as shown in the lower part of FIG. 1, and located behind column 5 is a column 4, which is not shown here and which corresponds to the column 4 as shown in the upper portion of FIG. 1. Thus, the four columns of the two afore-described types are disposed diagonally and in opposite direction to each other.

The fixed mold mounting plate and the movable mold mounting plate each carry the corresponding half-molds 17a and 17b, here shown in open position.

Spindle 13, with its end facing away from the fixed mold mounting plate 2, is supported in the clamping cylinder 7 and coupled to a drive wheel 18, which is driven via a toothed belt 19 by a drive motor not shown here, but which is the single drive motor utilized to drive the two-platen closing unit. A stepped plunger 20, which is arranged between drive wheel 18 and the end of the clamping cylinder 7 facing away from the fixed mold mounting plate 2, is traversed by a spindle 13, which is freely rotatable but is fixedly secured in axial direction. Between plunger unit 20 and the cylinder housing 21 adjoining the clamping cylinder 7 is a hydraulic pressure compartment 22, which also houses the support for the drive wheel 18.

The two dual action clamping plungers 8 are both provided with a flow passage 23, which connects the clamping pressure compartment 10 with opening pressure compartment 11. A flow valve in the form of a stem-like valve body 24 is disposed in the flow passage 23. In a first position as shown in FIG. 1, the valve body 24 locks the flow passage 23 through action of a pressure spring 25, and in a second position the flow passage 23 is open. The valve body 24 includes a flow channel 26, leading from clamping pressure compartment 10 to valve pressure space 10 to valve compartment 27, in which pressure spring 25 is disposed.

A pressure gauge is located in at least one of these channels 16, which connects the clamping pressure compartments 10 and 15.

Valve body 24 is movably guided in valve compartment 27, which is in fluid connection with the hollow compartment 14 via hydraulic line 29 and a pilot valve 30. When in position 0, the pilot valve 30 is closed, and when switched into position 1 set for flow-through. Hydraulic oil coming from hollow compartment 14 and feeding through spindle nut 12 and spindle 13 serves as lubrication for the spindle drive, wherein the residual oil R indicated by a broken line reaches tank 32 via a collection line 31.

The stepped plunger 20 admitted in pressure compartment 22 is in fluid connection with the clamping pressure compartments 10 and 15 via a hydraulic line 33 and valve 34. Valve 34 is closed at position 0, and open for flow-through when in position 1.

A mechanism for securing the required system pressure of approximately 10–15 bar includes a filling pump 36 in a system pressure line 35 for conveying hydraulic oil from tank 32 via a filter 37 and a one-way valve 38 which locks in the direction of the tank 32. The system pressure line 35 branches into line 35*a* leading into the two opening pressure compartments 11 and line 35*b* leading to a bubble tank 39. Bubble tank 39 is connected to hydraulic line 33 by an intermediary one way valve 40 locking in the direction of the bubble tank 39. The system pressure is detected via a pressure gauge 41 disposed in the system pressure line 35*b*.

In an alternative embodiment, the flow valve may consist of a pressure transmitting plunger movably guided within a pressure transmitting cylinder, and corresponds to the pressure transmitting plunger and the construction parts associated therewith (pressure plunger, small pressure plunger, valve sleeve, groove, outer ring stop, closing proximate pressure transmitting space and opening proximate pressure transmitting space) as in FIG. 1 of DE 43 44 340, the entire disclosure of which is hereby incorporated by reference. According to FIG. 1 here, the hydraulic line 33 in the alternative embodiment leads into the opening proximate pressure transmitting space 25.

In accordance with the alternative embodiment, only the pressure medium generated from stepped plunger 20 is fed into hydraulic line 33, such that after the closing motion is terminated, the stepped plunger is moved into working stroke direction by spindle 13 by the single drive motor for generating pressure.

The following describes the function of the closing unit and in particular, the accelerated closing function of the closing unit. Prior to the start of the closing phase of the two-platen closing unit, the two half-molds 17*a* and 17*b* are in an open position as seen in FIG. 1. Furthermore, as shown in FIG. 1, the stepped plunger 20 is in the right-hand stop position. The flow valve, specifically the valve body 24 is switched so that the flow passage 23 is in the flow-through position. The pilot valve 30 is in a switch position 1, wherein the valve compartment 27 is in fluid connection with hollow compartment 14. Valve 34 is switched into position 0.

When the spindle 13 is driven by the single drive of the closing unit in closing direction, the movable mold mounting plate 3 is moved to the right toward a closing position, until the two mold tool halves 17*a* and 17*b* are adjoining each other. In this operating phase, the hydraulic oil which is situated in the two opening pressure compartments 11 is fed into the two clamping pressure compartments 10 and 15 via the open flow-valve (valve body 24). The open position of the flow valve is realized, in that valve compartment 27 of valve body 24 is pressureless switched via the hydraulic line 29 and the pilot valve 30 and the system pressure (10–15 bar) from the opening pressure compartment 11 is effective as ascertained by the bubble tank 39 and the filling pump 36.

In order to generate the pressure needed for the closing phase of the two-platen closing unit, the flow valve (valve body 24) is closed and the pilot valve 30 is brought into position 0 (closed position) and valve 34 into position 1 (flow-through position). When turning the spindle 13 further in the closing direction, pressure medium is fed from the pressure compartment 22 via valve 34 into closing spaces 10 and 15. The pressure gauge 28 located in the channel that connects the two clamping pressure compartments 10 and 15 detects the desired closing pressure, whereupon the valve 34 closes (position 0) and the desired closing pressure for the duration of the injection process is locked in. The hydraulic fluid in the clamping pressure compartments 10 and 15 which is under the closing pressure acts upon the ring-shaped plunger faces 50 of the four clamping plungers 8 and 9, of which in FIG. 1 only one of each are shown.

For reducing the closing pressure, valve 34 is brought into switching position 1 so that the closing pressure from the closing pressure phase in the clamping pressure compartments 10 and 15 can dissipate. The stepped plunger 20 is reset to the starting position by turning the spindle 13 in opening direction as seen in FIG. 1.

When opening the closing unit in accelerated manner, the flow valve (valve body 24), the pilot valve 30 and the valve 34 are brought into the same position as they were for the accelerated closing. After the closing pressure is reduced, turning the spindle 13 further in opening direction causes the movable mold mounting plate 3 to move in direction to the left in opening direction until the distance of the half-molds are approximately at the distance as shown in FIG. 1. In this operating phase, the hydraulic oil in the clamping pressure compartments 10 and 15 is fed into the two opening pressure compartments 11 via the flow-valve (valve body 24).

When generating the system pressure, the pressure gauge 41 first detects the pressure reduction in the system caused by the control fluid in bubble tank 39. When the lower pressure value (e.g. 10 bar) is reached, the filling pump 36 is hooked up and the pressure fluid filtered through filter 37 is fed into the pressure system. When the upper value is reached in the bubble tank 39 (e.g. 15 bar), the filter pump 37 is turned off.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A two-platen closing unit for an injection molding machine comprising:

a fixed mold mounting plate;

a moving mold mounting plate;

a plurality of columns received in the moving mold mounting plate and traversing the fixed mold mounting plate, each said column slidingly supported in the fixed mold mounting plate and having a clamping plunger received in a clamping cylinder, thereby defining a clamping pressure compartment, whereby the clamping pressure compartments in the clamping cylinders are in hydraulic communication with one another, wherein a first plurality of clamping plungers is configured as a dual-action plunger which divides the clamping cylinder into the clamping pressure compartment and an opening pressure compartment and includes a flow passage for connecting the clamping pressure compartment with the opening pressure compartment;

a spindle drive coupled to a second plurality of clamping plungers and having spindles connected in driving relationship with a hydraulic piston and cylinder drive for feeding a hydraulic pressure medium into the clamping pressure compartments of the second plurality of clamping plungers, wherein the hydraulic piston and cylinder drive defines a pressure compartment;

a flow control valve disposed in the flow passage and including a stem-like valve body which closes the flow passage in a first operative position and clears the flow passage in a second operative position;

a pilot valve interacting with the valve body to control the first and second positions of the valve body;

a shut-off connection line for fluidly connecting the pressure compartment of each spindle drive with the clamping pressure compartments, and a pressure source connected to the opening compartments for ensuring a minimum pressure.

2. The two-platen closing unit of claim 1, wherein the valve body is configured as a stem-like part which is reciprocally supported in a cylindrical piston compartment and having two piston-like ends; wherein one of said ends can optionally be switched into an open or closed position and the other of said ends defines a valve compartment in the cylindrical piston compartment and acted upon by a spring; wherein disposed in the valve body is a connecting channel for connecting the clamping pressure compartments with the cylindrical valve compartment, and wherein a hydraulic control line extends from the cylindrical valve compartment in direction to the pilot valve which can be brought into locked position or pressure reducing flow-through position.

3. The two-platen closing unit of claim 1, further comprising a system pressure generating mechanism which includes a filling pump for filling the pressure medium from a tank via a filter and a one-way valve into a system pressure line for fluid connection with the opening pressure compartments, a bubble tank and the hydraulic line and leading from the pressure compartments of a piston cylinder unit actuated by the spindle to the clamping pressure compartments.

4. The two-platen closing unit of claim 1, wherein extending from the pilot valve a hydraulic line leads to the hollow compartment from where the pressure medium can be fed, after it has passed the spindle into the tank, by means of a reflux line.

5. The two-platen closing unit of claim 1, wherein the flow-valve comprises a pressure transmitting plunger movably guided in a pressure transmitting cylinder, the pressure transmitting plunger having a larger and a smaller plunger surface, and wherein the pressure from the pressure compartment can act upon the larger surface, and wherein the smaller plunger surface causes pressure formed from the pressure compartment to be transferred as an overpressure into the clamping compartments after the flow-passage between the clamping compartment and the opening pressure compartment is closed.

* * * * *